US011261088B2

United States Patent
Ning et al.

(10) Patent No.: US 11,261,088 B2
(45) Date of Patent: Mar. 1, 2022

(54) METHOD FOR PRODUCTION OF AMMONIUM PHOSPHATE FROM PHOSPHATE ROCK SLURRY

(71) Applicant: Kunming University of Science and Technology, Kunming (CN)

(72) Inventors: Ping Ning, Kunming (CN); Rui Cao, Kunming (CN); Xueqian Wang, Kunming (CN); Senlin Tian, Kunming (CN); Yixing Ma, Kunming (CN); Langlang Wang, Kunming (CN); Yingjie Zhang, Kunming (CN); Peng Chen, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 17/033,788

(22) Filed: Sep. 26, 2020

(65) Prior Publication Data

US 2021/0114878 A1    Apr. 22, 2021

(30) Foreign Application Priority Data

Oct. 17, 2019 (CN) .......................... 201910987249.9

(51) Int. Cl.
| | | |
|---|---|---|
| *C01F 11/46* | (2006.01) | |
| *C01B 25/28* | (2006.01) | |
| *B01D 53/50* | (2006.01) | |
| *B01D 53/73* | (2006.01) | |
| *B01D 53/80* | (2006.01) | |

(52) U.S. Cl.
CPC ............ *C01B 25/28* (2013.01); *B01D 53/502* (2013.01); *B01D 53/73* (2013.01); *B01D 53/80* (2013.01); *C01F 11/464* (2013.01); *C01F 11/468* (2013.01); *B01D 2251/404* (2013.01); *B01D 2251/61* (2013.01); *B01D 2257/302* (2013.01)

(58) Field of Classification Search
CPC .. B01D 53/1481; B01D 53/50; B01D 53/502; B01D 2251/61; B01D 2257/302; B01D 2257/406; B01D 2258/0283; C01F 11/464; C01B 25/28; C01B 25/32; C05B 7/00; C05B 11/00; C05C 3/00; C05C 11/00
See application file for complete search history.

(56) References Cited

U.S. PATENT DOCUMENTS

| | | | | |
|---|---|---|---|---|
| 3,421,848 A | * | 1/1969 | Liviu ................... | C01B 25/405 423/310 |
| 3,886,259 A | * | 5/1975 | Nikolai, Jr. ............... | C01F 5/40 423/166 |
| 3,936,525 A | * | 2/1976 | Lanning ............... | B01D 53/501 423/243.01 |
| 4,154,800 A | * | 5/1979 | Cannon ................... | C01B 25/01 423/157.4 |
| 4,247,321 A | * | 1/1981 | Persinger ............... | B01D 53/56 71/59 |

FOREIGN PATENT DOCUMENTS

| | | | | | |
|---|---|---|---|---|---|
| BE | | 901 491 A | * | 5/1985 | ............. C05B 13/06 |
| CN | | 106316510 A | * | 1/2017 | ............... C05B 7/00 |

* cited by examiner

*Primary Examiner* — Timothy C Vanoy
(74) *Attorney, Agent, or Firm* — Matthias Scholl P.C.; Matthias Scholl

(57) ABSTRACT

A method for production of ammonium phosphate from phosphate rock slurry. The method includes: introducing flue gas containing $SO_2$ into a phosphate rock slurry, to yield an absorption solution; evaporating waste ammonia water containing 10-20 wt. % ammonia to yield ammonia gas; introducing the ammonia gas into the absorption solution at a temperature of 110-135° C. until a neutralization degree of the absorption solution reaches 1.5-1.6, thus yielding an ammonium phosphate solution and calcium sulfate; separating the calcium sulfate from the ammonium phosphate solution; and introducing the ammonium phosphate solution to a granulator for granulation to yield ammonium phosphate granules; drying and sieving the ammonium phosphate granules, thereby yielding ammonium phosphate.

3 Claims, No Drawings

METHOD FOR PRODUCTION OF AMMONIUM PHOSPHATE FROM PHOSPHATE ROCK SLURRY

CROSS-REFERENCE TO RELATED APPLICATIONS

Pursuant to 35 U.S.C. § 119 and the Paris Convention Treaty, this application claims foreign priority to Chinese Patent Application No. 201910987249.9 filed Oct. 17, 2019, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a method for production of ammonium phosphate from phosphate rock slurry.

Conventionally, ammonium phosphate is produced by contacting 85% (wt.) phosphoric acid with ammonia water. 85% (wt.) phosphoric acid is costly and the method also produces waste gas, waste water and waste residue.

Industrial waste gas contains sulfur dioxide ($SO_2$). Direct discharge of $SO_2$ into the atmosphere leads to environmental pollution.

SUMMARY

The disclosure provides a method for production of ammonium phosphate from phosphate rock slurry. The method comprises: introducing flue gas containing $SO_2$ into a phosphate rock slurry, to yield an absorption solution; evaporating waste ammonia water containing 10-20 wt. % ammonia to yield ammonia gas; introducing the ammonia gas into the absorption solution at a temperature of 110-135° C. until a neutralization degree of the absorption solution reaches 1.5-1.6, thus yielding an ammonium phosphate solution and calcium sulfate; separating the calcium sulfate from the ammonium phosphate solution; and introducing the ammonium phosphate solution to a granulator for granulation to yield ammonium phosphate granules; drying and sieving the ammonium phosphate granules, thereby yielding ammonium phosphate.

Specifically, the technical solutions are described as follows.

S1: A phosphate rock is ground by a ball mill until more than 90% of phosphate rock powders pass through a 100-mesh sieve (0.15 mm). The phosphate rock powders are mixed with water in a surge tank to yield phosphate rock slurry; a solid content of the phosphate rock slurry is 35-55% (mass ratio of solid substances in the slurry to the slurry). The pH value of the phosphate rock slurry is 4-6. The phosphate rock slurry is guided out of the surge tank and transferred through a slurry pump to a circulation pump. A flue gas containing 10-25% (v/v) of $O_2$ and less than or equal to 3% (v/v) of $SO_2$ is introduced to an absorption tower with a liquid-gas ratio of 8-12 L/m³. The phosphate rock slurry is pumped into the absorption tower through the circulation pump and contacts the flue gas to yield an absorption solution. The temperature in the absorption tower is 25-60° C. The concentration of $SO_2$ at the outlet of the absorption tower is measured.

The total reaction formula for desulfurization reaction of the flue gas is as follows:

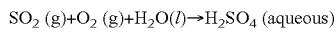

S2: The absorption solution obtained in S1) is buffered in an oxidation buffer tank, and then transferred to a neutralization tank of a wet process phosphoric acid workshop through an output pump. The phosphate rock in the phosphate slurry reacts with the produced $H_2SO_4$ to generate phosphoric acid, completing a reaction cycle. After the reaction, the mass concentration of phosphoric acid in the absorption solution is greater than or equal to 3%. The concentration of $SO_2$ at the outlet of the absorption tower reduces to ≤300 mg/m³, and the pH value of the phosphate slurry is ≤1.5.

The total chemical reaction formula of decomposing phosphate rock through $H_2SO_4$ (the production process of phosphoric acid) is as follows:

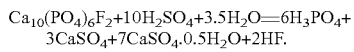

The chemical reaction process is divided into three steps. First, $CaSO_4$ and $H_3PO_4$ are generated in the reaction system of $H_2SO_4$ and phosphate rock slurry; Second, $H_3PO_4$ decomposes $Ca_{10}(PO_4)_6F_2$ to produce $Ca(H_2PO_4)_2$; and third, $Ca(H_2PO_4)_2$ reacts with $H_2SO_4$ to produce phosphoric acid.

S3: Ammonia evaporation

1) The waste ammonia water containing 10-20% ammonia (the waste ammonia water is recovered from chemical fertilizer enterprises) is introduced at normal temperature to an evaporator. The evaporator condenses the low-pressure saturated water steam to release the latent heat to heat and evaporate the waste ammonia water.

2) The low-pressure saturated steam enters the shell side of the evaporator through a pipeline and is condensed to release heat and exchange heat with ammonia water in the shell side. The ammonia water absorbs the heat and is heated up and evaporated to produce ammonia gas (the temperature of ammonia gas/water steam >130° C.).

3) The ammonia gas is guided out of the evaporator and flows to the neutralization tank, and the steam condensate is drained and discharged.

S4: Neutralization

The ammonia gas is introduced into the absorption solution in the neutralization tank. The water content of the absorption solution is 20-25%, and the temperature is 110-135° C. The ammonia gas reacts with phosphoric acid to produce various nitrogen-containing compounds. With the progress of neutralization of phosphoric acid and the ammonia gas, three main compounds are produced: ammonium sulfate, monoammonium phosphate and diammonium phosphate:

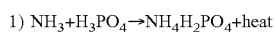

When the ammonia gas contacts phosphoric acid, the above reaction occurs immediately. When the molecular ratio of $NH_3$ to $H_3PO_4$ is equal to 1.0, monoammonium phosphate is formed and no free $H_3PO_4$ produced. When monoammonium phosphate is further neutralized, a mixed slurry of monoammonium phosphate and diammonium phosphate is produced. When the neutralization degree is 1.5, diammonium phosphate and monoammonium phosphate account for 50% respectively. When the neutralization proceeds, diammonium phosphate is produced.

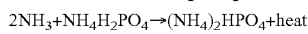

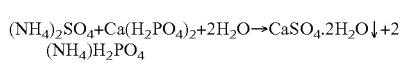

In the process of introducing the ammonia gas into the absorption slurry, the free sulfuric acid in the absorption slurry reacts with the ammonia gas to form ammonium sulfate; the ammonium sulfate reacts with monocalcium phosphate generated by decomposition of phosphoric acid to form calcium sulfate crystal; the mixed liquor from the neutralization tank is filtered and separated to obtain ammonium phosphate solution, and the separated calcium sulfate is crystallized for later use.

Each of the above reactions produces a large amount of heat which is used to evaporate part of the water in the phosphoric acid; when the neutralization degree of the phosphoric acid is below 0.6, the phosphoric acid is returned to the neutralization tank to react with ammonia to generate slurry (the neutralization degree of the slurry is 1.5-1.6).

S5: Granulation and drying

The ammonium phosphate solution is sent into a granulator by the slurry pump for granulation. Specifically, the ammonium phosphate solution is sent into the granulator by the slurry pump and mixed with a circulating material of dried ammonium phosphate for granulation; the excess water in the phosphate solution is absorbed by the circulating material of dried ammonium phosphate, and the ammonium phosphate solution is coated on the surface of the circulating material of dried ammonium phosphate and solidified into granules; the ammonia gas is further added into the granulator to ammoniate the ammonium phosphate solution to a neutralization degree of 1.8-1.9 (subject to the actual content of impurities in phosphoric acid). The ammonization reaction evaporates part of water, promotes the solidification of the slurry, and the water content of the ammonium phosphate at the outlet is 3-5%; the ammonium phosphate prepared by the granulator is further dried to less than 2.0% of water content by a dryer, and the drying medium is hot air generated by coal combustion in a hot blast stove.

S6: Sieving and production of circulating material

The dried granules are screened, and the granules with a particle size of 2-4 mm are cooled and packaged as a final product. The granules with a particle size larger than 4 mm are crushed. The crushed granules, granules with a particle size less than 2 mm, and part of granules with a particle size of 2-4 mm are mixed as a circulating material returning back to the granulator for continuous production.

The total reaction formula of ammonium phosphate production is as follows:

$$NH_3H_2O \xrightarrow[NaOH+Ca(OH)_2]{\Delta} NH_3 + H_2O;$$

$$3NH_3 + H_3PO_4 \rightarrow (NH_4)_3PO_4.$$

The removal of $SO_2$ from the flue gas through the phosphate rock slurry is a novel desulfurization method suitable for enterprises with coal-fired boilers for phosphate rock production. The method has the characteristics of easy access to raw materials, reuse of by-products produced from desulfurization, and simple operation. The phosphate rock contains metal impurities, mainly iron, aluminum, magnesium, etc., and the metal ions can effectively absorb $SO_2$ in the flue gas. In addition, the by-product phosphoric acid can be recycled and reacts with ammonia to produce ammonium phosphate.

The following advantages are associated with the method of the disclosure:

1. The phosphate rock slurry as desulfurizer is obtained from a phosphating plant, which is cheap and easy to obtain and can be recycled.

2. The method removes the metal impurities in the phosphate rock slurry, and the produced calcium sulfate can be recycled for use.

3. Using waste ammonia water and phosphoric acid to produce ammonium phosphate is cost-effective.

DETAILED DESCRIPTION

To further illustrate, embodiments detailing a method for production of ammonium phosphate from phosphate rock slurry are described below. It should be noted that the following embodiments are intended to describe and not to limit the disclosure.

Example 1

1) A phosphate rock was ground by a ball mill until 95% of the produced phosphate rock powders passed through a 100-mesh sieve (0.15 mm). The phosphate rock powders were mixed with distilled water in a surge tank to yield phosphate rock slurry; the solid content of the phosphate rock slurry was 35%. The pH value of the phosphate rock slurry was 4. The phosphate rock slurry was guided out of the surge tank and transferred through a slurry pump to a circulation pump. A flue gas containing 10% (v/v) of $O_2$ and 3% (v/v) of $SO_2$ was introduced to an absorption tower. The liquid-gas ratio was 8 L/m³. The phosphate rock slurry was pumped into the absorption tower through the circulation pump and contacted the flue gas to yield an absorption solution. The concentration of $SO_2$ at the outlet of the absorption tower was measured. The temperature in the absorption tower was 30° C.

2) The absorption solution obtained in 1) was buffered in an oxidation buffer tank, and then transferred to a neutralization tank of a wet process phosphoric acid workshop through an output pump, where the mass concentration of phosphoric acid in the absorption solution rose to 5%. The concentration of $SO_2$ at the outlet reduced to 250 mg/m³, and the pH value of the phosphate slurry was ≤1.5.

3) The waste ammonia water containing 10% ammonia was introduced to an evaporator at normal temperature. The evaporator condensed the low-pressure saturated water steam to release the latent heat to heat and evaporate the waste ammonia water.

4) The low-pressure saturated steam entered the shell side of the evaporator through a pipeline and was condensed to release heat and exchanged heat with ammonia water in the shell side. The ammonia water absorbed the heat and was heated up and evaporated to produce ammonia gas. The temperature of ammonia gas/water steam was 130° C.

5) The ammonia gas was guided out of the evaporator and flowed to the neutralization tank, and the steam condensate was drained and discharged.

6) The ammonia gas was introduced to the neutralization tank to neutralize the absorption solution. The water content of the absorption solution was 20%, and the temperature was 120° C. The neutralization degree of the absorption solution was 1.5-1.6.

7) The neutralized absorption solution was sent into a granulator by the slurry pump and mixed with a circulating material of dried ammonium phosphate for granulation; the excess water in the absorption solution was absorbed by the circulating material of dried ammonium phosphate, and the neutralized absorption solution was coated on the surface of the circulating material of dried ammonium phosphate and solidified into granules; the ammonia gas was further added into the granulator to ammoniate the neutralized absorption solution to a neutralization degree of 1.8-1.9 (subject to the actual content of impurities in phosphoric acid). The ammonization reaction evaporated part of water, promoted the solidification of the slurry, and the water content of the ammonium phosphate at the outlet was 5%; the ammonium phosphate prepared by the granulator was further dried to less than 2.0% of water content by a dryer.

8) The dried ammonium phosphate granules were screened, and the granules with a particle size of 2-4 mm were cooled and packaged as a final product. The granules with a particle size larger than 4 mm were crushed. The crushed granules, granules with a particle size less than 2 mm, and part of granules with a particle size of 2-4 mm were mixed as a circulating material returning back to the granulator for continuous production.

Example 2

1) A phosphate rock was ground by a ball mill until 93% of the produced phosphate rock powders passed through a 100-mesh sieve (0.15 mm). The phosphate rock powders were mixed with distilled water in a surge tank to yield phosphate rock slurry; the solid content of the phosphate rock slurry was 40%. The pH value of the phosphate rock slurry was 5. The phosphate rock slurry was guided out of the surge tank and transferred through a slurry pump to a circulation pump. A flue gas containing 12% (v/v) of $O_2$ and 2% (v/v) of $SO_2$ was introduced to an absorption tower. The liquid-gas ratio was 10 L/m$^3$. The phosphate rock slurry was pumped into the absorption tower through the circulation pump and contacted the flue gas to yield an absorption solution. The concentration of $SO_2$ at the outlet of the absorption tower was measured. The temperature in the absorption tower was 35° C.

2) The absorption solution obtained in 1) was buffered in an oxidation buffer tank, and then transferred to a neutralization tank of a wet process phosphoric acid workshop through an output pump, where the mass concentration of phosphoric acid in the absorption solution rose to 5%. The concentration of $SO_2$ at the outlet reduced to 200 mg/m$^3$, and the pH value of the phosphate slurry was ≤1.5.

3) The waste ammonia water containing 12% ammonia was introduced to an evaporator at normal temperature. The evaporator condensed the low-pressure saturated water steam to release the latent heat to heat and evaporate the waste ammonia water.

4) The low-pressure saturated steam entered the shell side of the evaporator through a pipeline and was condensed to release heat and exchanged heat with ammonia water in the shell side. The ammonia water absorbed the heat and was heated up and evaporated to produce ammonia gas. The temperature of ammonia gas/water steam was 160° C.

5) The ammonia gas was guided out of the evaporator and flowed to the neutralization tank, and the steam condensate was drained and discharged.

6) The ammonia gas was introduced to the neutralization tank to neutralize the absorption solution. The water content of the absorption solution was 22%, and the temperature was 125° C. The neutralization degree of the absorption solution was 1.5-1.6.

7) The neutralized absorption solution was sent into a granulator by the slurry pump and mixed with a circulating material of dried ammonium phosphate for granulation; the excess water in the absorption solution was absorbed by the circulating material of dried ammonium phosphate, and the neutralized absorption solution was coated on the surface of the circulating material of dried ammonium phosphate and solidified into granules; the ammonia gas was further added into the granulator to ammoniate the neutralized absorption solution to a neutralization degree of 1.8-1.9 (subject to the actual content of impurities in phosphoric acid). The ammonization reaction evaporated part of water, promoted the solidification of the slurry, and the water content of the ammonium phosphate at the outlet was 3.7%; the ammonium phosphate prepared by the granulator was further dried to less than 2.0% of water content by a dryer.

8) The dried ammonium phosphate granules were screened, and the granules with a particle size of 2-4 mm were cooled and packaged as a final product. The granules with a particle size larger than 4 mm were crushed. The crushed granules, granules with a particle size less than 2 mm, and part of granules with a particle size of 2-4 mm were mixed as a circulating material returning back to the granulator for continuous production.

Example 3

1) A phosphate rock was ground by a ball mill until 98% of the produced phosphate rock powders passed through a 100-mesh sieve (0.15 mm). The phosphate rock powders were mixed with distilled water in a surge tank to yield phosphate rock slurry; the solid content of the phosphate rock slurry was 45%. The pH value of the phosphate rock slurry was 5. The phosphate rock slurry was guided out of the surge tank and transferred through a slurry pump to a circulation pump. A flue gas containing 15% (v/v) of $O_2$ and 2% (v/v) of $SO_2$ was introduced to an absorption tower. The liquid-gas ratio was 10 L/m$^3$. The phosphate rock slurry was pumped into the absorption tower through the circulation pump and contacted the flue gas to yield an absorption solution. The concentration of $SO_2$ at the outlet of the absorption tower was measured. The temperature in the absorption tower was 40° C.

2) The absorption solution obtained in 1) was buffered in an oxidation buffer tank, and then transferred to a neutralization tank of a wet process phosphoric acid workshop through an output pump, where the mass concentration of phosphoric acid in the absorption solution rose to 8%. The concentration of $SO_2$ at the outlet reduced to 150 mg/m$^3$, and the pH value of the phosphate slurry was ≤1.5.

3) The waste ammonia water containing 14% ammonia was introduced to an evaporator at normal temperature. The evaporator condensed the low-pressure saturated water steam to release the latent heat to heat and evaporate the waste ammonia water.

4) The low-pressure saturated steam entered the shell side of the evaporator through a pipeline and was condensed to release heat and exchanged heat with ammonia water in the shell side. The ammonia water absorbed the heat and was heated up and evaporated to produce ammonia gas. The temperature of ammonia gas/water steam was 150° C.

5) The ammonia gas was guided out of the evaporator and flowed to the neutralization tank, and the steam condensate was drained and discharged.

6) The ammonia gas was introduced to the neutralization tank to neutralize the absorption solution. The water content of the absorption solution was 23%, and the temperature was 128° C. The neutralization degree of the absorption solution was 1.5-1.6.

7) The neutralized absorption solution was sent into a granulator by the slurry pump and mixed with a circulating material of dried ammonium phosphate for granulation; the excess water in the absorption solution was absorbed by the circulating material of dried ammonium phosphate, and the neutralized absorption solution was coated on the surface of the circulating material of dried ammonium phosphate and solidified into granules; the ammonia gas was further added into the granulator to ammoniate the neutralized absorption solution to a neutralization degree of 1.8-1.9 (subject to the actual content of impurities in phosphoric acid). The ammonization reaction evaporated part of water, promoted the solidification of the slurry, and the water content of the ammonium phosphate at the outlet was 4%; the ammonium phosphate prepared by the granulator was further dried to less than 2.0% of water content by a dryer.

8) The dried ammonium phosphate granules were screened, and the granules with a particle size of 2-4 mm were cooled and packaged as a final product. The granules with a particle size larger than 4 mm were crushed. The crushed granules, granules with a particle size less than 2 mm, and part of granules with a particle size of 2-4 mm were mixed as a circulating material returning back to the granulator for continuous production.

Example 4

1) A phosphate rock was ground by a ball mill until 96% of the produced phosphate rock powders passed through a 100-mesh sieve (0.15 mm). The phosphate rock powders were mixed with distilled water in a surge tank to yield phosphate rock slurry; the solid content of the phosphate rock slurry was 50%. The pH value of the phosphate rock slurry was 5.5. The phosphate rock slurry was guided out of the surge tank and transferred through a slurry pump to a circulation pump. A flue gas containing 20% (v/v) of $O_2$ and 2% (v/v) of $SO_2$ was introduced to an absorption tower. The liquid-gas ratio was 9 L/m$^3$. The phosphate rock slurry was pumped into the absorption tower through the circulation pump and contacted the flue gas to yield an absorption solution. The concentration of $SO_2$ at the outlet of the absorption tower was measured. The temperature in the absorption tower was 45° C.

2) The absorption solution obtained in 1) was buffered in an oxidation buffer tank, and then transferred to a neutralization tank of a wet process phosphoric acid workshop through an output pump, where the mass concentration of phosphoric acid in the absorption solution rose to 3%. The concentration of $SO_2$ at the outlet reduced to 300 mg/m$^3$, and the pH value of the phosphate slurry was ≤1.5.

3) The waste ammonia water containing 16% ammonia was introduced to an evaporator at normal temperature. The evaporator condensed the low-pressure saturated water steam to release the latent heat to heat and evaporate the waste ammonia water.

4) The low-pressure saturated steam entered the shell side of the evaporator through a pipeline and was condensed to release heat and exchanged heat with ammonia water in the shell side. The ammonia water absorbed the heat and was heated up and evaporated to produce ammonia gas. The temperature of ammonia gas/water steam was 180° C.

5) The ammonia gas was guided out of the evaporator and flowed to the neutralization tank, and the steam condensate was drained and discharged.

6) The ammonia gas was introduced to the neutralization tank to neutralize the absorption solution. The water content of the absorption solution was 25%, and the temperature was 130° C. The neutralization degree of the absorption solution was 1.5-1.6.

7) The neutralized absorption solution was sent into a granulator by the slurry pump and mixed with a circulating material of dried ammonium phosphate for granulation; the excess water in the absorption solution was absorbed by the circulating material of dried ammonium phosphate, and the neutralized absorption solution was coated on the surface of the circulating material of dried ammonium phosphate and solidified into granules; the ammonia gas was further added into the granulator to ammoniate the neutralized absorption solution to a neutralization degree of 1.8-1.9 (subject to the actual content of impurities in phosphoric acid). The ammonization reaction evaporated part of water, promoted the solidification of the slurry, and the water content of the ammonium phosphate at the outlet was 4%; the ammonium phosphate prepared by the granulator was further dried to less than 2.0% of water content by a dryer.

8) The dried ammonium phosphate granules were screened, and the granules with a particle size of 2-4 mm were cooled and packaged as a final product. The granules with a particle size larger than 4 mm were crushed. The crushed granules, granules with a particle size less than 2 mm, and part of granules with a particle size of 2-4 mm were mixed as a circulating material returning back to the granulator for continuous production.

Example 5

1) A phosphate rock was ground by a ball mill until 91% of the produced phosphate rock powders passed through a 100-mesh sieve (0.15 mm). The phosphate rock powders were mixed with distilled water in a surge tank to yield phosphate rock slurry; the solid content of the phosphate rock slurry was 55%. The pH value of the phosphate rock slurry was 5.8. The phosphate rock slurry was guided out of the surge tank and transferred through a slurry pump to a circulation pump. A flue gas containing 23% (v/v) of $O_2$ and 3% (v/v) of $SO_2$ was introduced to an absorption tower. The liquid-gas ratio was 11 L/m$^3$. The phosphate rock slurry was pumped into the absorption tower through the circulation pump and contacted the flue gas to yield an absorption solution. The concentration of $SO_2$ at the outlet of the absorption tower was measured. The temperature in the absorption tower was 55° C.

2) The absorption solution obtained in 1) was buffered in an oxidation buffer tank, and then transferred to a neutralization tank of a wet process phosphoric acid workshop through an output pump, where the mass concentration of phosphoric acid in the absorption solution rose to 5%. The concentration of $SO_2$ at the outlet reduced to 250 mg/m$^3$, and the pH value of the phosphate slurry was ≤1.5.

3) The waste ammonia water containing 14% ammonia was introduced to an evaporator at normal temperature. The evaporator condensed the low-pressure saturated water steam to release the latent heat to heat and evaporate the waste ammonia water.

4) The low-pressure saturated steam entered the shell side of the evaporator through a pipeline and was condensed to release heat and exchanged heat with ammonia water in the shell side. The ammonia water absorbed the heat and was heated up and evaporated to produce ammonia gas. The temperature of ammonia gas/water steam was 130° C.

5) The ammonia gas was guided out of the evaporator and flowed to the neutralization tank, and the steam condensate was drained and discharged.

6) The ammonia gas was introduced to the neutralization tank to neutralize the absorption solution. The water content of the absorption solution was 25%, and the temperature was 133° C. The neutralization degree of the absorption solution was 1.5-1.6.

7) The neutralized absorption solution was sent into a granulator by the slurry pump and mixed with a circulating material of dried ammonium phosphate for granulation; the excess water in the absorption solution was absorbed by the circulating material of dried ammonium phosphate, and the neutralized absorption solution was coated on the surface of the circulating material of dried ammonium phosphate and solidified into granules; the ammonia gas was further added into the granulator to ammoniate the neutralized absorption solution to a neutralization degree of 1.8-1.9 (subject to the actual content of impurities in phosphoric acid). The ammonization reaction evaporated part of water, promoted the solidification of the slurry, and the water content of the ammonium phosphate at the outlet was 4%; the ammonium phosphate prepared by the granulator was further dried to less than 2.0% of water content by a dryer.

8) The dried ammonium phosphate granules were screened, and the granules with a particle size of 2-4 mm were cooled and packaged as a final product. The granules with a particle size larger than 4 mm were crushed. The crushed granules, granules with a particle size less than 2 mm, and part of granules with a particle size of 2-4 mm were mixed as a circulating material returning back to the granulator for continuous production.

It will be obvious to those skilled in the art that changes and modifications may be made, and therefore, the aim in the appended claims is to cover all such changes and modifications.

What is claimed is:

1. A method, comprising:
1) introducing flue gas containing $SO_2$ and oxygen into an absorption tower, and pumping a phosphate rock slurry comprising $Ca_{10}(PO_4)_6F_2$ into the absorption tower to contact the flue gas, whereby a first absorption solution comprising sulfuric acid and 20-25 wt. % of water is yielded;
2) transferring the absorption solution obtained in 1) into a neutralization tank, and reacting phosphate rock with sulfuric acid in the first absorption solution to obtain a second absorption solution comprising phosphoric acid and calcium sulfate;
3) evaporating waste ammonia water containing 10-20 wt. % ammonia to yield ammonia gas;
4) introducing the ammonia gas into the second absorption solution at a temperature of 110-135° C. until a neutralization degree of the second absorption solution reaches 1.5-1.6, thus yielding an ammonium phosphate solution and calcium sulfate;
5) separating the calcium sulfate from the ammonium phosphate solution; and
6) introducing the ammonium phosphate solution to a granulator for granulation to yield ammonium phosphate granules; drying and sieving the ammonium phosphate granules, thereby yielding ammonium phosphate.

2. The method of claim 1, wherein the phosphate rock slurry has a solid content of 35-55 wt. %, and is prepared by: grinding a phosphate rock using a ball mill until more than 90% of phosphate rock powders pass through a 100-mesh sieve; and mixing the phosphate rock powders with water in a surge tank.

3. The method of claim 2, wherein the flue gas comprises 10-25% (v/v) of $O_2$ and less than or equal to 3% (v/v) of $SO_2$; the phosphate rock slurry has a pH value of 4-6; the phosphate rock slurry and the flue gas are introduced to an absorption tower in a liquid-gas ratio of 8-12 $L/m^3$, and a temperature in the absorption tower is 25-60° C.

* * * * *